United States Patent
Lee et al.

(10) Patent No.: US 8,264,632 B2
(45) Date of Patent: *Sep. 11, 2012

(54) REPAIR STRUCTURE AND METHOD FOR LIQUID CRYSTAL DISPLAY

(75) Inventors: Kun-Chen Lee, Tainan (TW);
Chia-Hua Yu, New Taipei (TW);
Sung-Chun Lin, Tainan (TW);
Chang-Ching Yeh, Magong (TW);
Hsuan-Chen Liu, Kaohsiung (TW)

(73) Assignee: Hannstar Display Corp., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/247,703

(22) Filed: Sep. 28, 2011

(65) Prior Publication Data

US 2012/0021663 A1    Jan. 26, 2012

Related U.S. Application Data

(63) Continuation of application No. 12/350,367, filed on Jan. 8, 2009, now Pat. No. 8,059,223, which is a continuation-in-part of application No. 11/669,972, filed on Feb. 1, 2007, now Pat. No. 7,492,438.

(30) Foreign Application Priority Data

Mar. 1, 2006   (TW) ................................. 95106937 A

(51) Int. Cl.
*G02F 1/1343*    (2006.01)

(52) U.S. Cl. ........................................................ 349/55
(58) Field of Classification Search ............... 349/54–55
See application file for complete search history.

(56) References Cited

U.S. PATENT DOCUMENTS

| | | | |
|---|---|---|---|
| 6,819,370 B2 | 11/2004 | Sah et al. | |
| 6,980,264 B2 * | 12/2005 | Lee et al. | ......................... 349/54 |
| 7,224,415 B2 | 5/2007 | Yi et al. | |
| 7,532,271 B2 | 5/2009 | Hsu et al. | |

FOREIGN PATENT DOCUMENTS

CN           101216643           7/2008

OTHER PUBLICATIONS

Chinese language office action dated Feb. 9, 2011.
Lee, et al., Notice of Allowance and Fees due, mailed Oct. 8, 2008, filed Feb. 1, 2007, U.S. Appl. No. 11/669,972.

* cited by examiner

*Primary Examiner* — James Dudek
(74) *Attorney, Agent, or Firm* — Thomas|Kayden

(57) ABSTRACT

A data line repair structure for a liquid crystal display panel is disclosed. The data line repair structure includes a first repair line parallel to the scan line and crossing a first end of the data line; a fourth repair line formed in an oblique line area of the liquid crystal panel, coupled to the first repair line; a second repair line parallel to the data line, coupled to the gate driving chip and the fourth repair line; a third repair line parallel to the scan line, coupled to the second repair line and separated from a second end of the data line; and a floating line connected between the third repair line and the second end of the data line when the data line has a broken point.

18 Claims, 12 Drawing Sheets

REPAIR STRUCTURE AND METHOD FOR LIQUID CRYSTAL DISPLAY

CROSS REFERENCE TO RELATED APPLICATIONS

This application is a Continuation of U.S. patent application Ser. No. 12/350,367, filed on Jan. 8, 2009, and entitled "Repair Structure and Method for Liquid Crystal Display," (which is now U.S. Pat. No. 8,059,223), which is a Continuation-In-Part of U.S. patent application Ser. No. 11/669,972, filed on Feb. 1, 2007, and entitled "Repair Structure and Method for Liquid Crystal Display," (which is now U.S. Pat. No. 7,492,438, issued on Feb. 17, 2009), which claims priority of Taiwan Patent Application No. 095106937, filed on Mar. 1, 2006, the entirety of which is incorporated by reference herein.

BACKGROUND OF THE INVENTION

1. Field of the Invention

The invention relates to a data line repair structure and method for a liquid crystal display, and in particular to a data line repair structure and method applied to a chip-on-glass or thin film-on-glass structure.

2. Description of the Related Art

Active liquid crystal panels are currently broadly used in liquid crystal displays, liquid crystal display televisions and others, with panel size increasing. However, large liquid crystal panels use long lines, such as scan lines and data lines, to drive thin film transistors of each pixel unit. Broken points easily occur thereon during manufacture.

FIG. 1 shows a data line repair structure of a conventional liquid crystal display 100, comprising scan line 101 and intersecting data line 102. Gate driving chip 103 is bound to flexible board 104, forming a tape carrier package structure. One side of flexible board 104 is connected to liquid crystal display panel 100 and another side thereof is connected to printed circuit board 105. Source driving chip 106 is connected to flexible board 107, forming a tape carrier package structure. One side of flexible board 107 is connected to liquid crystal display panel 100 and another side thereof is connected to printed circuit board 108. Gate driving chip 103 generates a gate driving signal through scan line 101 to drive a thin film transistor (not shown in FIG. 1). Source driving chip 106 also generates a data signal through data line 102 to write the data signal to a pixel electrode (not shown in FIG. 1).

As shown in FIG. 1, the data line repair structure comprises first repair line 109 and second repair line 110. First repair line 109 is parallel to scan line 101 and crosses to one end of data line 102 on the opposite side of source driving chip 106. Second repair line 110 extends from the left side of flexible board 107 to the right side thereof and crosses to data line 102 connected to source driving chip 106. When data line 102 comprises broken point 111, a laser beam can be implanted to weld first repair line 109, second repair line 110 and data line 102 to form two connecting points 112a and 112b. First repair line 109 and second repair line 110 are connected through printed circuit boards 105 and 108. Thus, a data signal generated by source driving chip 106 is transmitted through second repair line 110, lines of printed circuit boards 108 and 105 and first repair line 109 sequentially to a data line above broken point 111.

The conventional repair structure and method use X and Y sides of printed circuit boards to connect a first repair line with a second repair line. If the liquid crystal display panel is chip-on-glass or chip-on-film structure, in which a driving chip is bound to the liquid crystal display panel or a flexible board to conserve X or Y sides of the printed circuit boards, the conventional repair structure and repair method can not be used.

BRIEF SUMMARY OF THE INVENTION

An exemplary embodiment of a data line repair structure for a liquid crystal display panel is disclosed. The liquid crystal display panel comprises a scan line, a data line crossing the scan line, a thin film transistor formed where the scan line crosses the data line and connected to a pixel electrode, a gate driving chip electrical connected to the scan line to generate a gate signal to drive the thin film transistor, and a source driving chip connected to the data line to provide a data signal to the pixel electrode. The data line repair structure comprises a first repair line parallel to the scan line and crossing a first end of the data line; a fourth repair line formed in an oblique line area of the liquid crystal panel, coupled to the first repair line; a second repair line parallel to the data line, coupled to the gate driving chip and the fourth repair line; a third repair line parallel to the scan line, coupled to the second repair line and separated from a second end of the data line; and a floating line connected between the third repair line and the second end of the data line when the data line has a broken point. In addition, portion of the floating line overlaps the repair line and the data line. A laser beam is implemented to weld the repair line and the data line having a broken point. Further, the floating line can be formed before M1 (gate line) process, between M1 (gale line) and M2 (data line) processes, or after M2 (data line) process. In addition, the repair line and the data line are electrically isolated with the floating line before welding with the floating line by the laser beam, and the material of the floating line can be made from metal, Indium Tin Oxide (ITO), or other conductive materials.

Another exemplary embodiment of a data line repair structure for a liquid crystal display panel is disclosed. The liquid crystal display panel comprises a scan line, a first data line and a second data line crossing the scan line, a first thin film transistor formed where the scan line crosses the first data line and connected to a first pixel electrode, a second thin film transistor formed where the scan line crosses the second data line and connected to a second pixel electrode, a gate driving chip connected to the scan line to generate a gate signal to drive the first thin film transistor and the second thin film transistor, and a source driving chip connected to the first data line and the second data line to respectively provide data signals to the first pixel electrode and the second pixel electrode. The data line repair structure comprises a first first repair line and a first second repair line parallel to the scan line and crossing a first end of each the first data line and the second data line; a second first repair line parallel to the first data line and coupled to the gate driving chip and the first first repair line; a second second repair line parallel to the first data line and coupled to the gate driving chip and the first second repair line; a third first repair line and a third second repair line respectively coupled to the second first repair line and the second second repair line, parallel to the scan line, and separated from a second end of each the first data line and the second data line; a first floating line corresponding to the first data line, overlapped and electrically isolated with the third first repair line and the second end of the first data line, and connected between the third first repair line and the second end of the first data line when the first data line has a first broken point; and a second floating line corresponding to the second data line, overlapped and electrically isolated with the third second repair line and the second end of the second data line, and connected between the third second repair line and the second end of the second data line when the second data line has a second broken point.

Another exemplary embodiment of a data line repair structure for a liquid crystal display panel is disclosed. The liquid crystal display panel comprises a scan line, a data line crossing the scan line, a thin film transistor formed where the scan line crosses the data line and connected to a pixel electrode, a gate driving chip electrical connected to the scan line to generate a gate signal to drive the thin film transistor, and a source driving chip connected to the data line to provide a data signal to the pixel electrode. The data line repair structure comprises a first repair line parallel to the scan line and crossing a first end of the data line; a fourth repair line formed in an oblique line area of the liquid crystal panel, coupled to the first repair line; a second repair line parallel to the data line, coupled to the fourth repair line and a bypass circuit line of a flexible board; a third repair line parallel to the scan line, coupled to the bypass circuit line of the flexible board and separated from a second end of the data line; and a floating line connected between the third repair line and the second end of the data line when the data line has a broken point.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
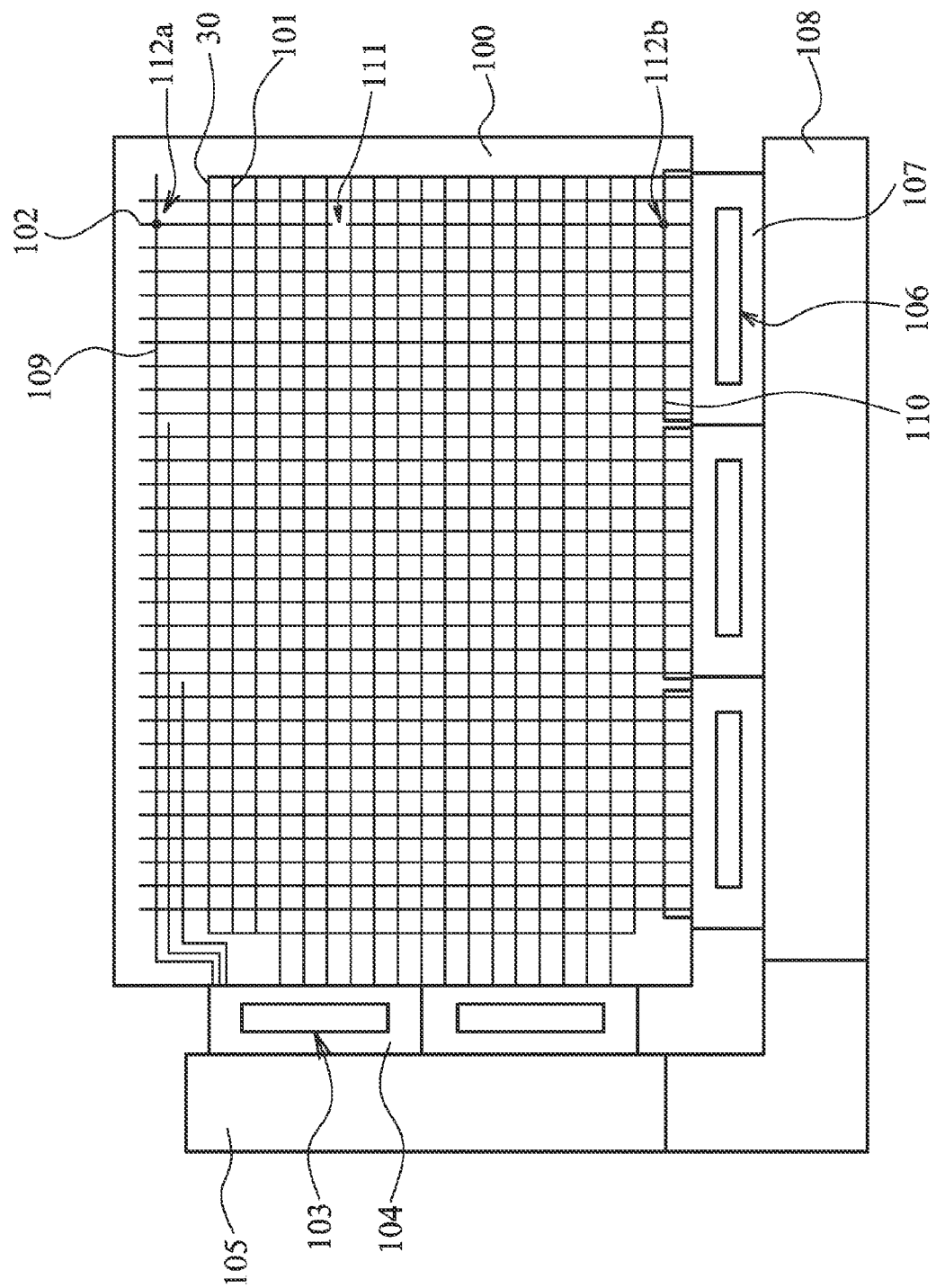
FIG. 1 shows a data line repair structure of a conventional liquid crystal display.
Figure 2:
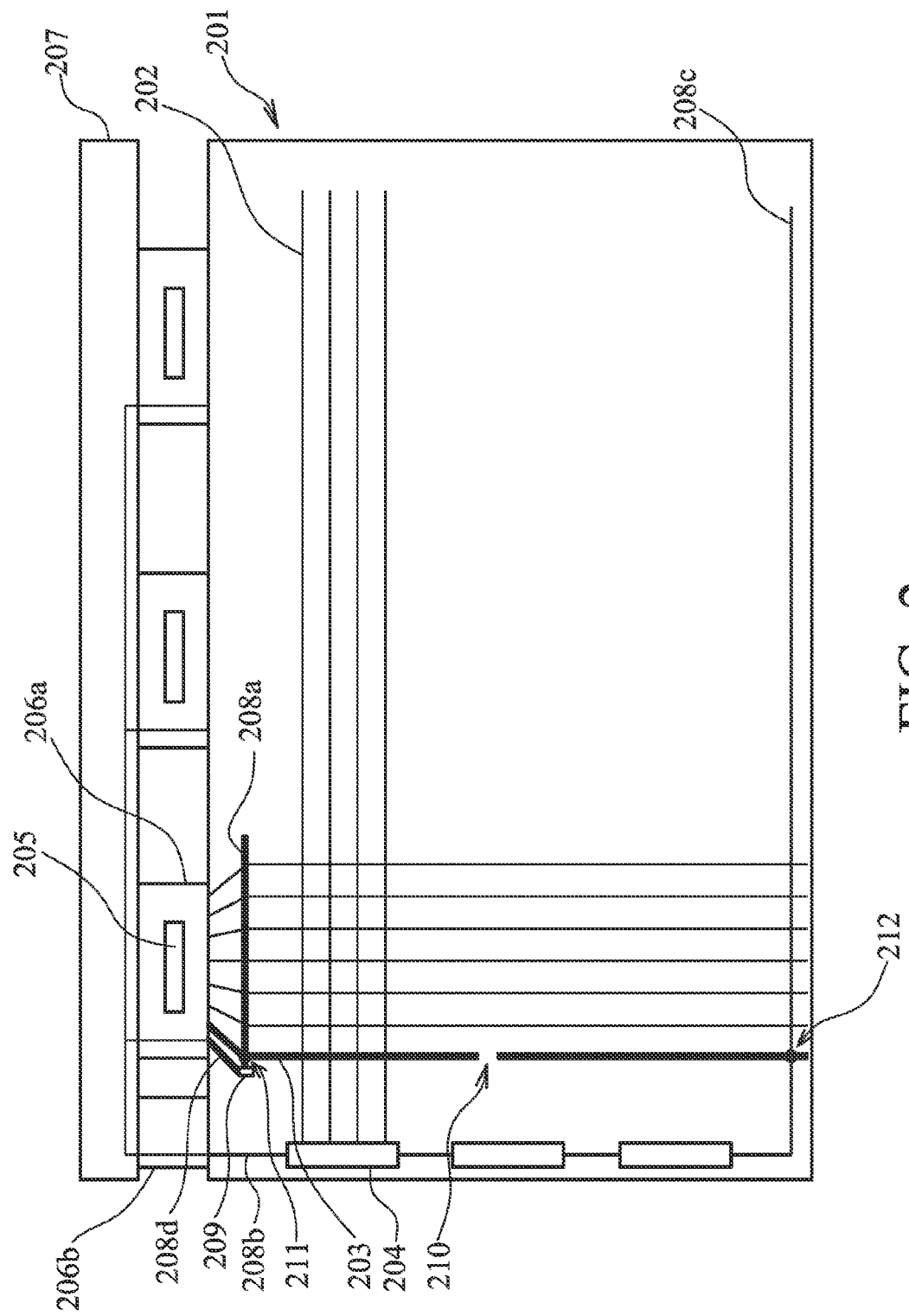
FIG. 2 shows a data line repair structure for a liquid crystal display panel according to a first embodiment of the invention.

FIG. 2 shows a data line repair structure for a liquid crystal display panel according to a first embodiment of the invention. Liquid crystal display panel 201, such as a glass baseboard, comprises scan line 202 and data line 203 crossing scan line 202. A thin film transistor (not shown in FIG. 2) is formed at an intersection of scan line 202 and data line 203. The thin film transistor comprises a gate coupled to scan line 202, a source coupled to data line 203 and a drain coupled to a pixel electrode (not shown). Gate driving chip 204 is connected by conductive glue to a Y side area of liquid crystal display panel 201, a chip-on-glass (COG) structure, and uses scan line 202 to transmit a gate signal to drive the thin film transistor. Source driving chip 205 is bound to flexible board 206a, a tape carrier package (TCP) structure, and uses data line 203 to transmit a data signal to write to the pixel electrode. One side of flexible board 206a is connected to liquid crystal display panel 201 and another side thereof is connected to printed circuit board 207. In addition, printed circuit board 207 comprises a plurality of power lines and ground lines.

As shown in FIG. 2, the data line repair structure comprises first repair line 208a, second repair line 208b and third repair line 208c. First repair line 208a is parallel to scan line 202 and crosses one end of data line 203 near source driving chip 205. Second repair line 208b is parallel to data line 203 and connected to gate driving chip 204. Second repair line 208b is connected to printed circuit board 207 through flexible board 206b. Third repair line 208c is parallel to scan line 202 and crosses another end of data line 203 on the opposite side of source driving chip 205. The data line repair structure further comprises fourth repair line 208d formed in an oblique line area of liquid crystal display panel 201 and connected to first repair line 208a and lines of printed circuit board 207 through flexible circuit board 206a. In addition, transparent conductive layer 209 is disposed between fourth repair line 208d and first repair line 208a.

According to the first embodiment of the invention, a laser beam can be implemented to weld first repair line 208a and data line 203 to form connecting point 211, weld third repair line 208c and data line 203 to form connecting point 212 and weld transparent conductive layer 209 to connect first repair line 208a with fourth repair line 208d when data line 203 comprises broken point 210. Thus, a data signal generated by source driving chip 205 is transmitted to data line below broken point 210 through first repair line 208a, fourth repair line 208d, flexible board 206a, lines of printed circuit board 207, flexible board 206b, second repair line 208b, inner circuits of gate driving chip 204 and third repair line 208c, sequentially.

Figure 3A:
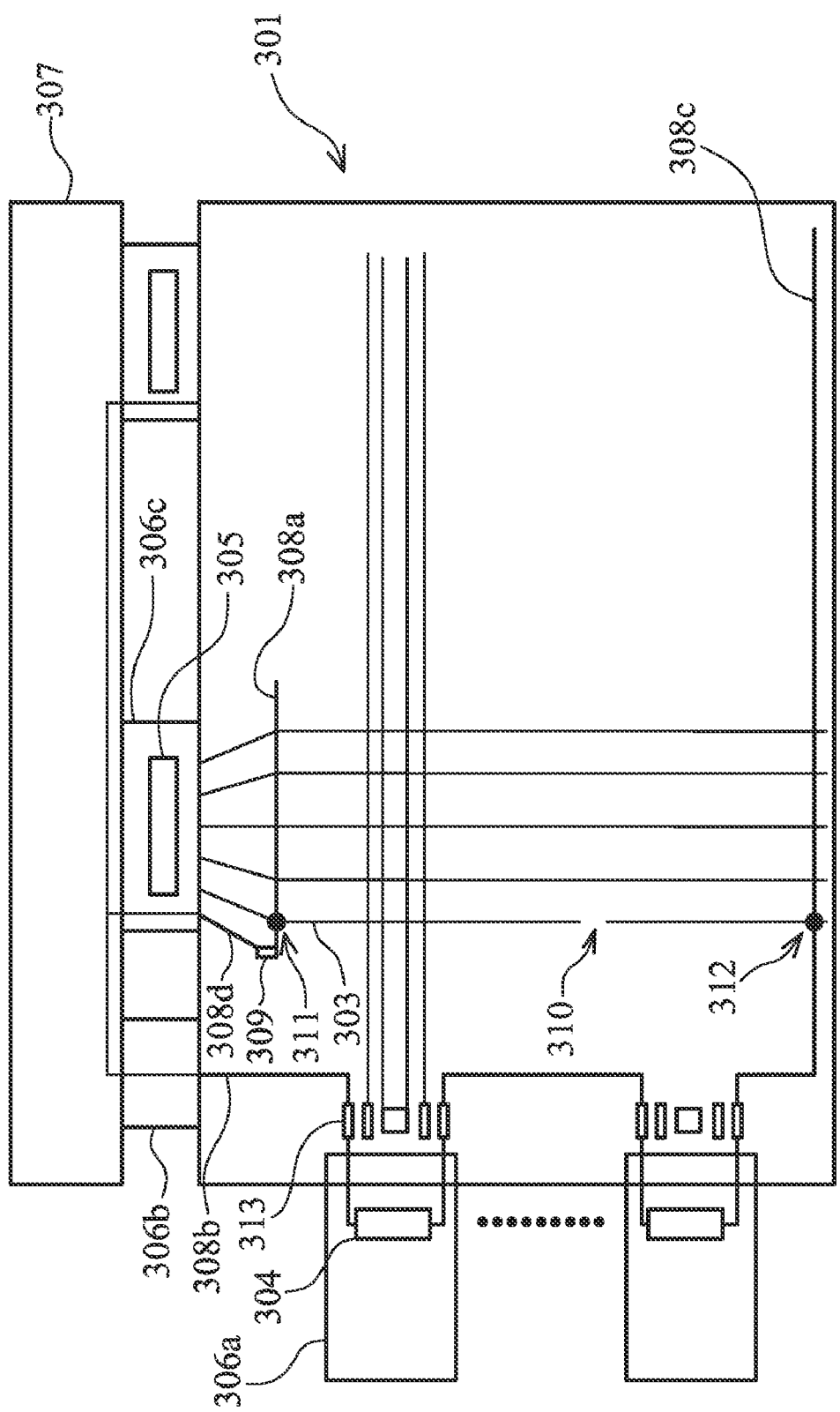
FIG. 3A shows a data line repair structure for a liquid crystal display panel according to a second embodiment of the invention.

FIG. 3A shows a data line repair structure for a liquid crystal display panel according to a second embodiment of the invention. Liquid crystal display panel 301 is similar to the first embodiment of the invention, except that, here, gate driving chip 304 is bound to flexible board 306a, a chip-on-film (COF) structure. Flexible board 306a is connected to liquid crystal display panel 301. Thus, second repair line 308b is connected to gate driving chip 304 through connecting pad 313 and one line of flexible board 306a. As shown in FIG. 3A, a laser beam can be implemented to weld first repair line 308a and data line 303 to form connecting point 311, weld third repair line 308c and data line 303 to form connecting point 312 and weld transparent conductive layer 309 to connect first repair line 308a with fourth repair line 308d when data line 303 comprises broken point 310. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, flexible board 306a, inner circuits of gate driving chip 304 and third repair line 308c sequentially.

Figure 3B:
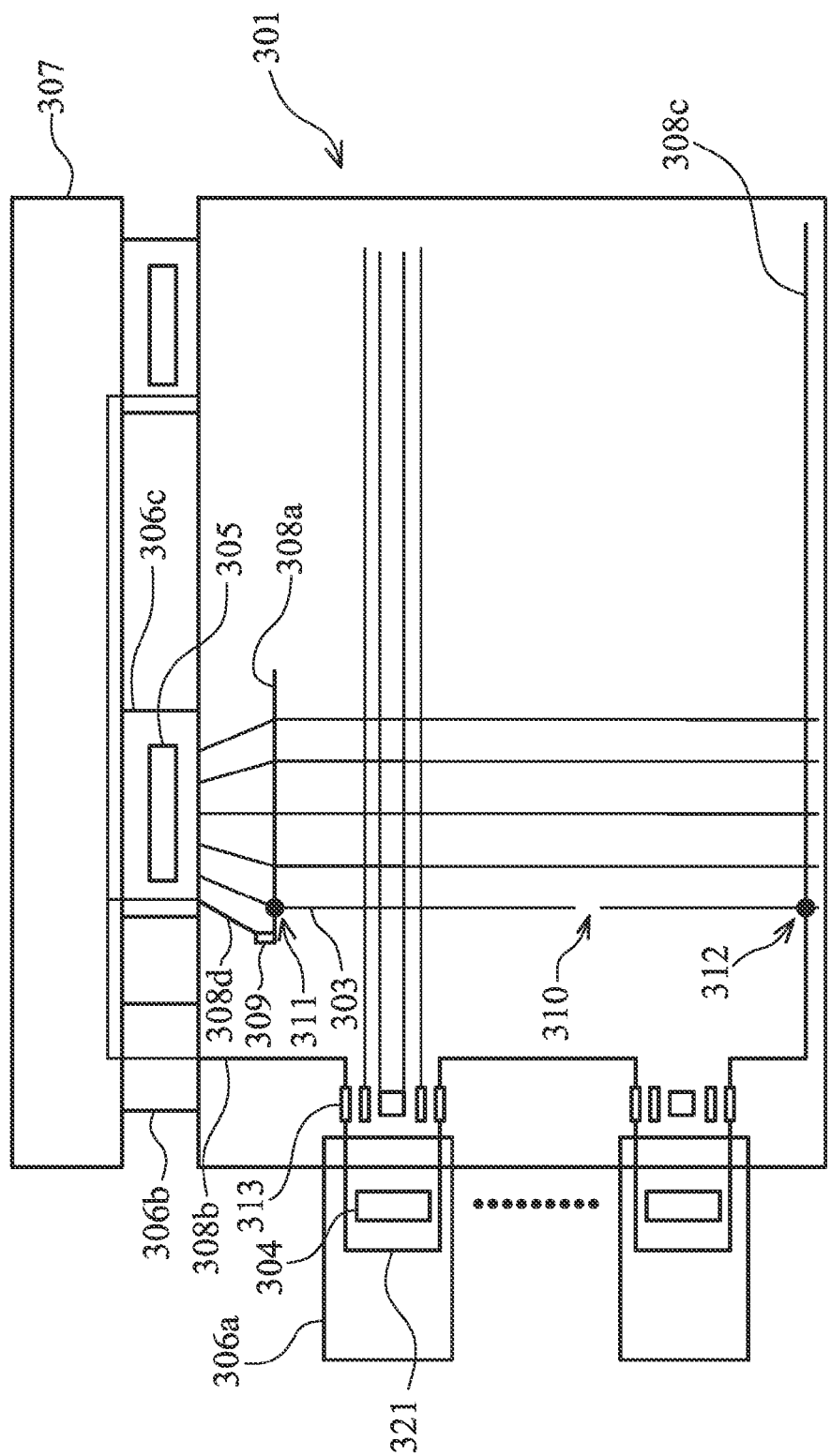
FIG. 3B shows a data line repair structure for a liquid crystal display panel according to a third embodiment of the invention.

FIG. 3B shows a data line repair structure for a liquid crystal display panel according to a third embodiment of the invention. A data signal generated by source driving chip 305 is transmitted through bypass circuit line 321 not inner circuits of gate driving chip 304. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, flexible board 306a, bypass circuit line circuit line 321 and third repair line 308c, sequentially.

Figure 4:
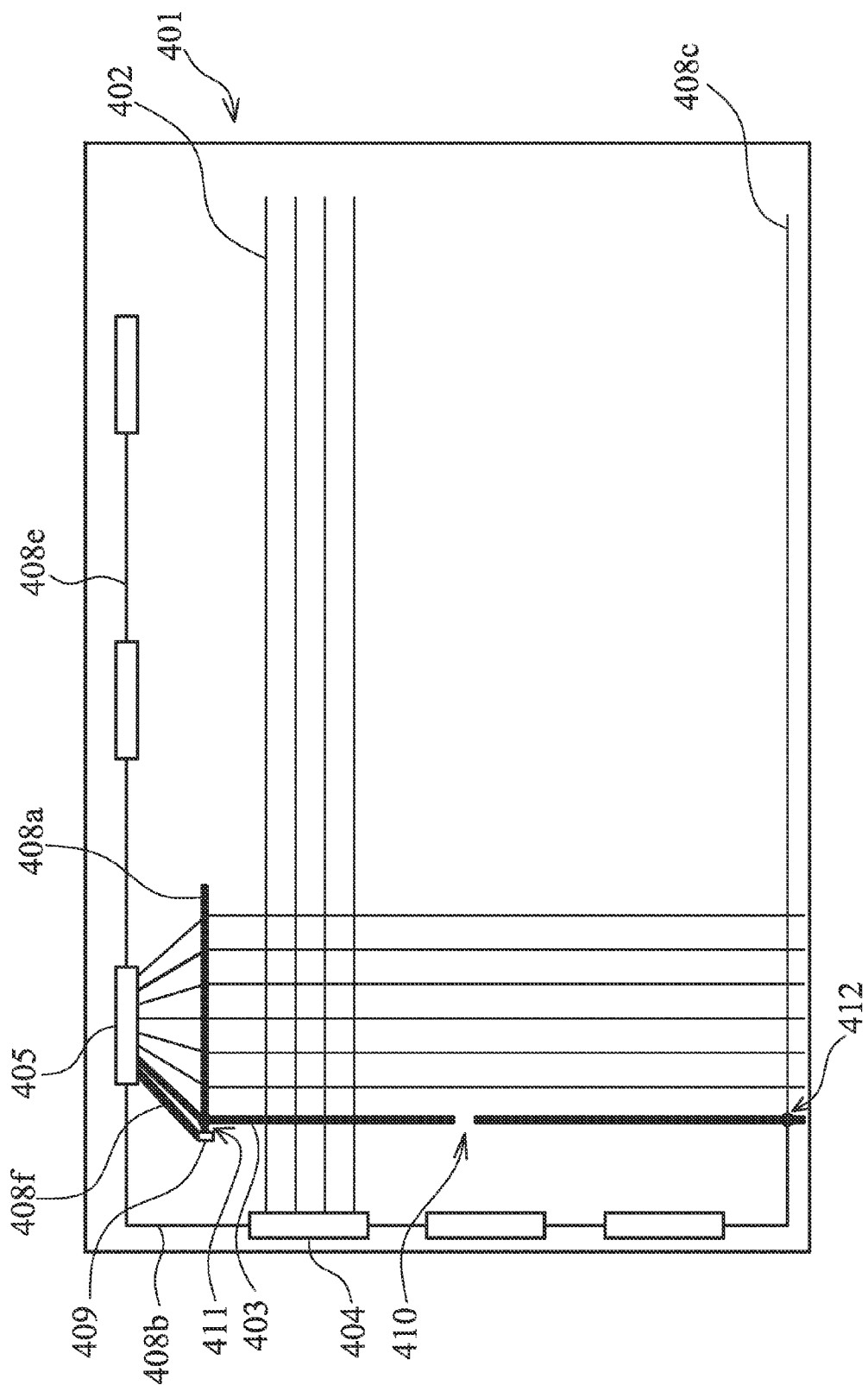
FIG. 4 shows a data line repair structure for a liquid crystal display panel according to a fourth embodiment of the invention.

FIG. 4 shows a data line repair structure for a liquid crystal display panel according to a fourth embodiment of the invention. Liquid crystal display panel 401 is similar to the first embodiment of the invention, except that, here, source driving chip 405 uses conductive glue to connect with an X side area of liquid crystal display panel 401. Thus, the data line repair structure further comprises fifth repair line 408e and sixth repair line 408f. Fifth repair line 408e is parallel to scan line 402 and connected to source driving chip 405. Sixth repair line 408f is formed in an oblique line area of liquid crystal display panel 401 and connected to first repair line 408a and inner circuits of source driving chip 405. In addition, transparent conductive layer 409 is disposed between sixth repair line 408f and first repair line 408a.

As shown in FIG. 4, the laser beam can be implemented to weld first repair line 408a and data line 403 to form connecting point 411, weld third repair line 408c and data line 403 to form connecting point 412 and weld transparent conductive layer 409 to connect first repair line 408a with sixth repair line 408f when data line 403 comprises broken point 410. Thus, a data signal generated by source driving chip 405 is transmitted to data line below broken point 410 through first repair line 408a, sixth repair line 408f, inner circuits of source driving chip 405, fifth repair line 408e, second repair line 408b, inner circuits of gate driving chip 404 and third repair line 408c, sequentially.

Figure 5:
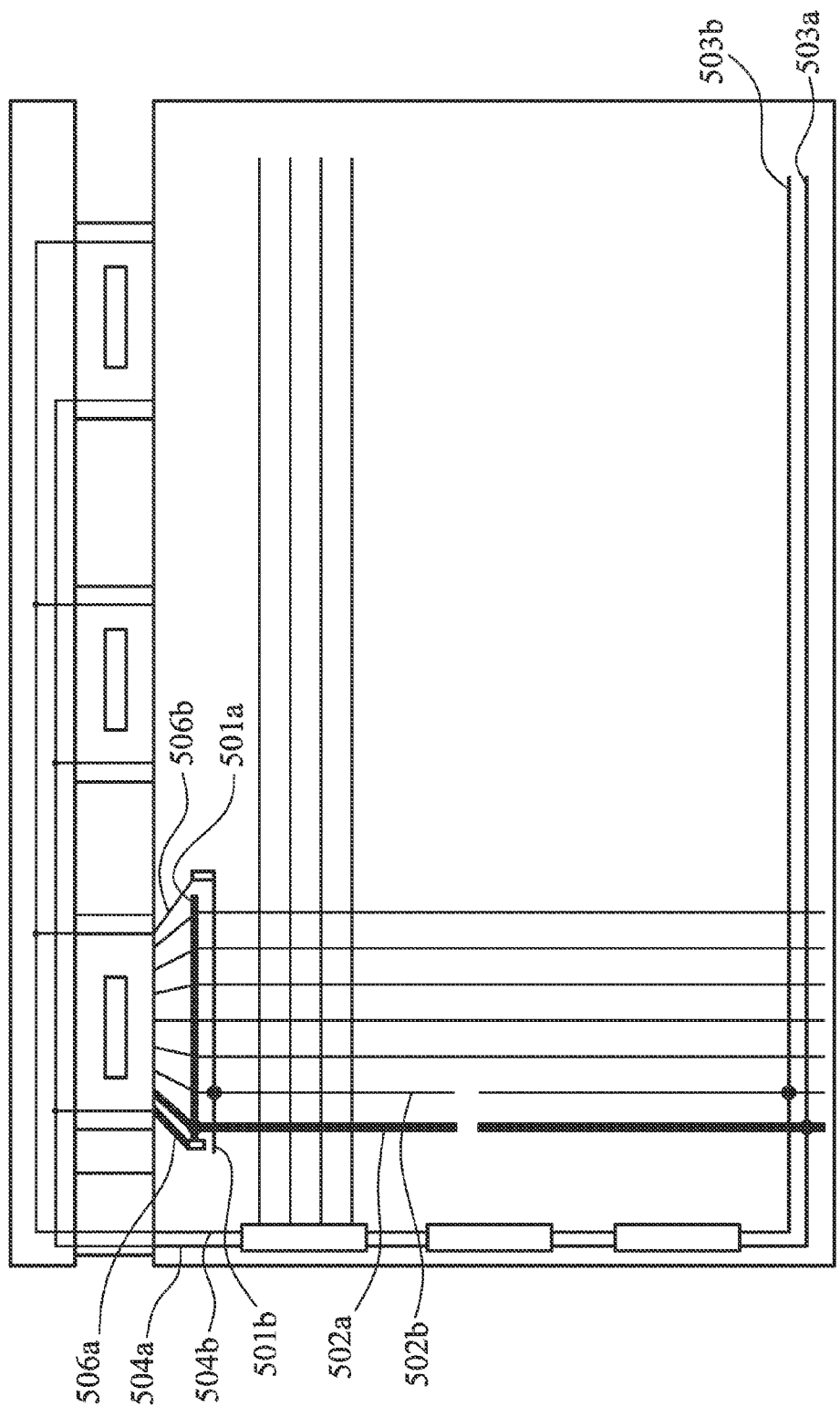
FIG. 5 shows a data line repair structure for a liquid crystal display panel according to a fifth embodiment of the invention.

In the embodiments, multiple repair lines of the data line repair structure are disclosed. Thus, if there are pluralities of data lines with broken points on crystal liquid display panel, each corresponding repair line can be used to repair each data line with a broken point. As shown in FIG. 5, first repair lines 501a and 501b are welded and connected to odd data line 502a and even data line 502b, respectively. Third repair line 503a and 503b are also welded and connected to odd data line 502a and even data line 502b respectively. Thus, when odd data line 502a has a broken point, it can use first repair line 501a, fourth repair line 506a, second repair line 504a and third repair line 503a to transmit a data signal. When even data line 502b has a broken point, it can use first repair line 501b, fourth repair line 506b, second repair line 504b and third repair line 503b to transmit a data signal.

Figure 6:
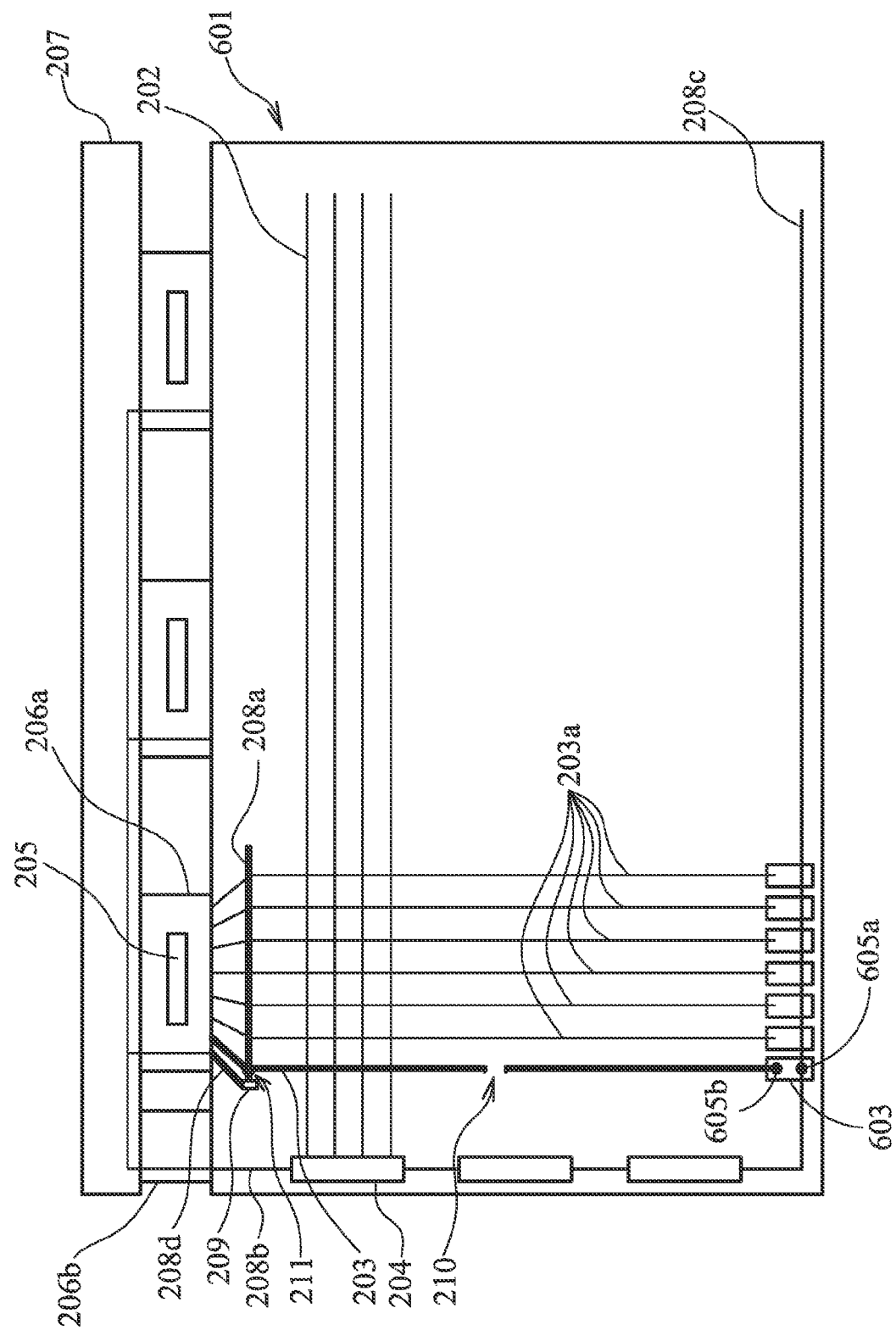
FIG. 6 shows a data line repair structure for a liquid crystal display panel according to another embodiment of the invention.

FIG. 6 shows a data line repair structure for a liquid crystal display panel according to another embodiment of the invention. Liquid crystal display panel 601 is similar to the first embodiment of the invention, except that, here, floating lines 603 are added, and third repair line 208c is not crosses the end of data line 203 on the opposite side of source driving chip 205. Specifically, third repair line 208c is separated from the end of data line 203 on the opposite side of source driving chip 205. Floating line 603 crosses a portion of third repair line 208c and overlaps the end of data line 203, and is welded by a laser beam to connect the third repair line 208c with the end of data line 203 where data line 203 comprises broken point 210. A laser beam can be implemented to weld first repair line 208a and data line 203 to form connecting point 211, weld third repair line 208c and floating line 603 to form connecting point 605a, weld data line 203 and floating line 603 to form connecting point 605b, and weld transparent conductive layer 209 to connect first repair line 208a with fourth repair line 208d when data line 203 comprises broken point 210. In embodiments of the invention, the material of the floating lines can be metal, Indium Tin Oxide (ITO), or other conductive materials. Thus, a data signal generated by source driving chip 205 is transmitted to data line below broken point 210 through first repair line 208a, fourth repair line 208d, flexible board 206a, lines of printed circuit board 207, flexible board 206b, second repair line 208b, inner circuits of gate driving chip 204, third repair line 208c and floating line 603, sequentially. Since the data lines 203a other than data line 203 are not electrically connected to third repair line 208c and without any overlapping with third repair line 208c, resistive-capacitive (RC) delay and signal interference among data lines 203a and third repair line 208c are reduced.

Figure 7A:
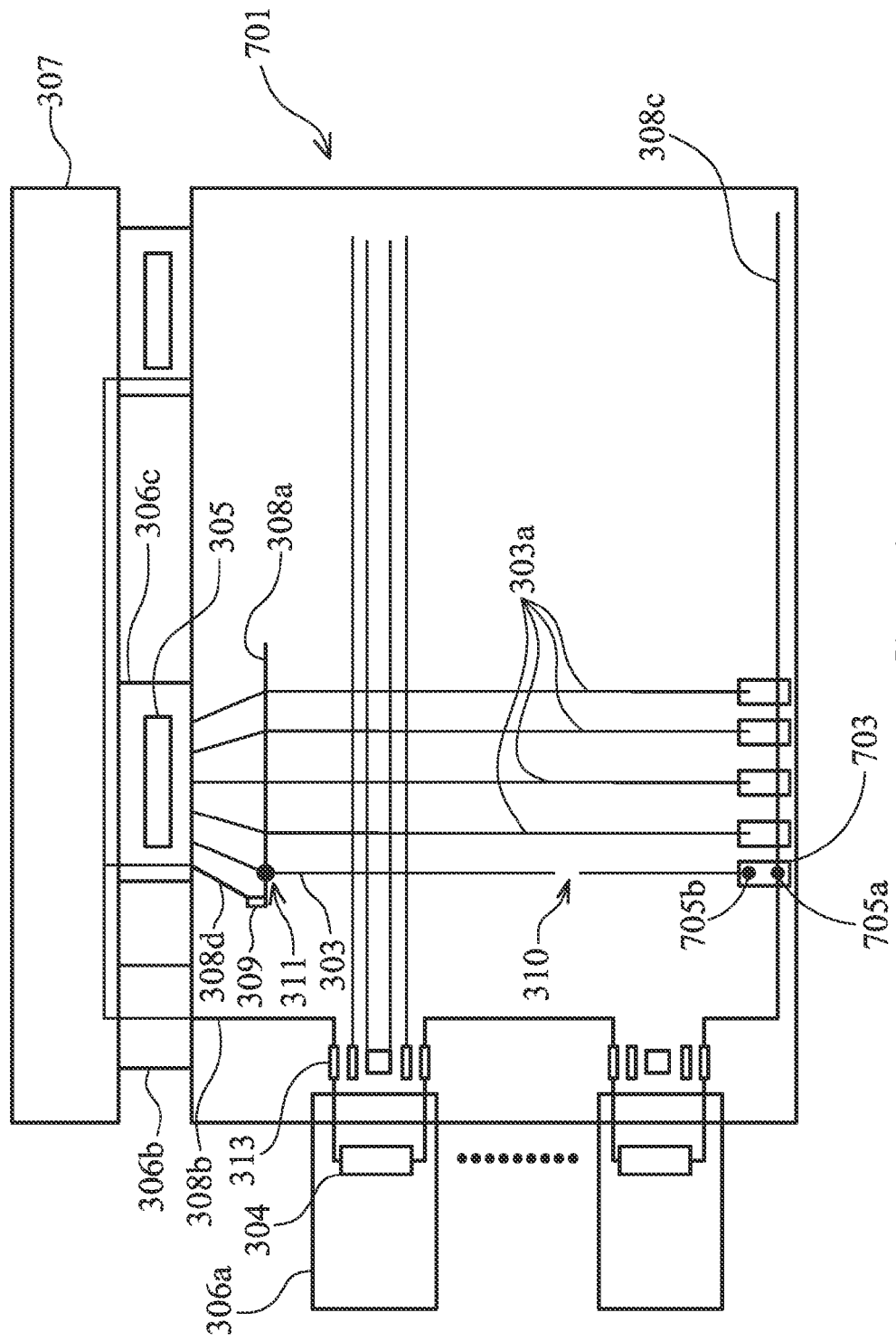
FIG. 7A shows a data line repair structure for a liquid crystal display panel according to another embodiment of the invention.

FIG. 7A shows a data line repair structure for a liquid crystal display panel according to another embodiment of the invention. Liquid crystal display panel 701 is similar to the second embodiment of the invention shown in FIG. 3A, except that, here, floating lines 703 are added, and third repair line 308c is not crosses the end of data line 303 on the opposite side of source driving chip 305. Specifically, third repair line 308c is separated from the end of data line 303 on the opposite side of source driving chip 305. Floating line 703 crosses a portion of third repair line 308c and overlaps the end of data line 303, and is welded by a laser beam to connect the third repair line 308c with the end of data line 303 where data line 303 comprises broken point 310. A laser beam can be implemented to weld first repair line 308a and data line 303 to form connecting point 311, weld third repair line 308c and floating line 703 to form connecting point 705a, weld data line 303 and floating line 703 to form connecting point 705b, and weld transparent conductive layer 309 to connect first repair line 308a with fourth repair line 308d when data line 303 comprises broken point 310. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, inner circuits of gate driving chip 304, third repair line 308c and floating line 703, sequentially. Since the data lines 303a other than data line 303 are not electrically connected to third repair line 308c and without any overlapping with third repair line 308c, resistive-capacitive (RC) delay and signal interference among data lines 303a and third repair line 308c are reduced.

Figure 7B:
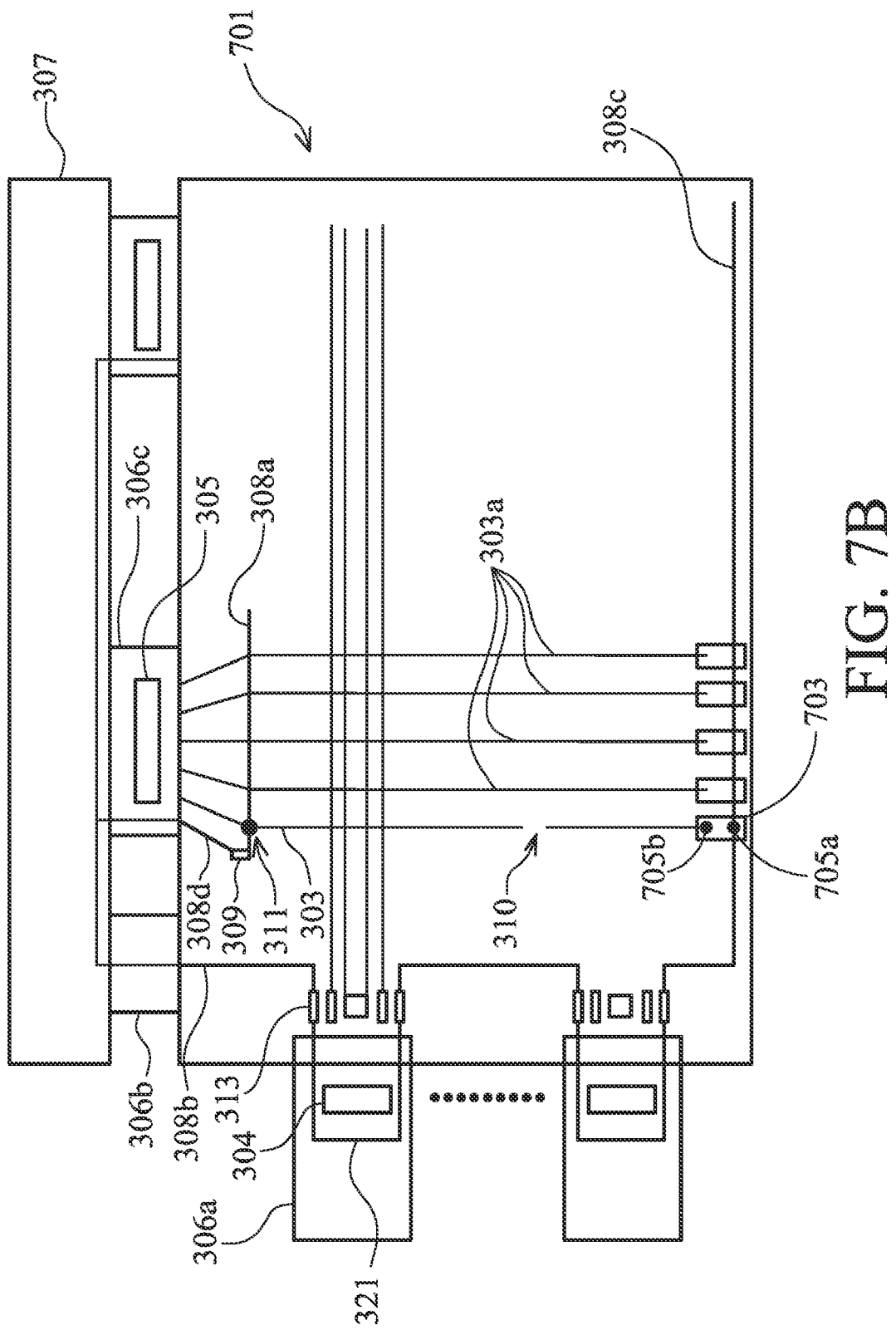
FIG. 7B shows a data line repair structure for a liquid crystal display panel according to another embodiment of the invention.

FIG. 7B shows a data line repair structure for a liquid crystal display panel according to another embodiment of the invention. Liquid crystal display panel 701 is similar to the second embodiment of the invention shown in FIG. 3B, except that, here, floating lines 703 are added, and third repair line 308c is not crosses the end of data line 303 on the opposite side of source driving chip 305. Specifically, third repair line 308c is separated from the end of data line 303 on the opposite side of source driving chip 305. Floating line 703 crosses a portion of third repair line 308c and overlaps the end of data line 303, and is welded by a laser beam to connect the third repair line 308c with the end of data line 303 where data line 303 comprises broken point 310. A laser beam can be implemented to weld first repair line 308a and data line 303 to form connecting point 311, weld third repair line 308c and floating line 703 to form connecting point 705a, weld data line 303 and floating line 703 to form connecting point 705b, and weld transparent conductive layer 309 to connect first repair line 308a with fourth repair line 308d when data line 303 comprises broken point 310. Thus, a data signal generated by source driving chip 305 is transmitted to data line below broken point 310 through first repair line 308a, fourth repair line 308d, flexible board 306c, lines of printed circuit board 307, flexible board 306b, second repair line 308b, line 321 of flexible board 306a, third repair line 308c and floating line 703, sequentially. Since the data lines 303a other than data line 303 are not electrically connected to third repair line 308c and without any overlapping with third repair line 308c, resistive-capacitive (RC) delay and signal interference among data lines 303a and third repair line 308c are reduced.

Figure 8:
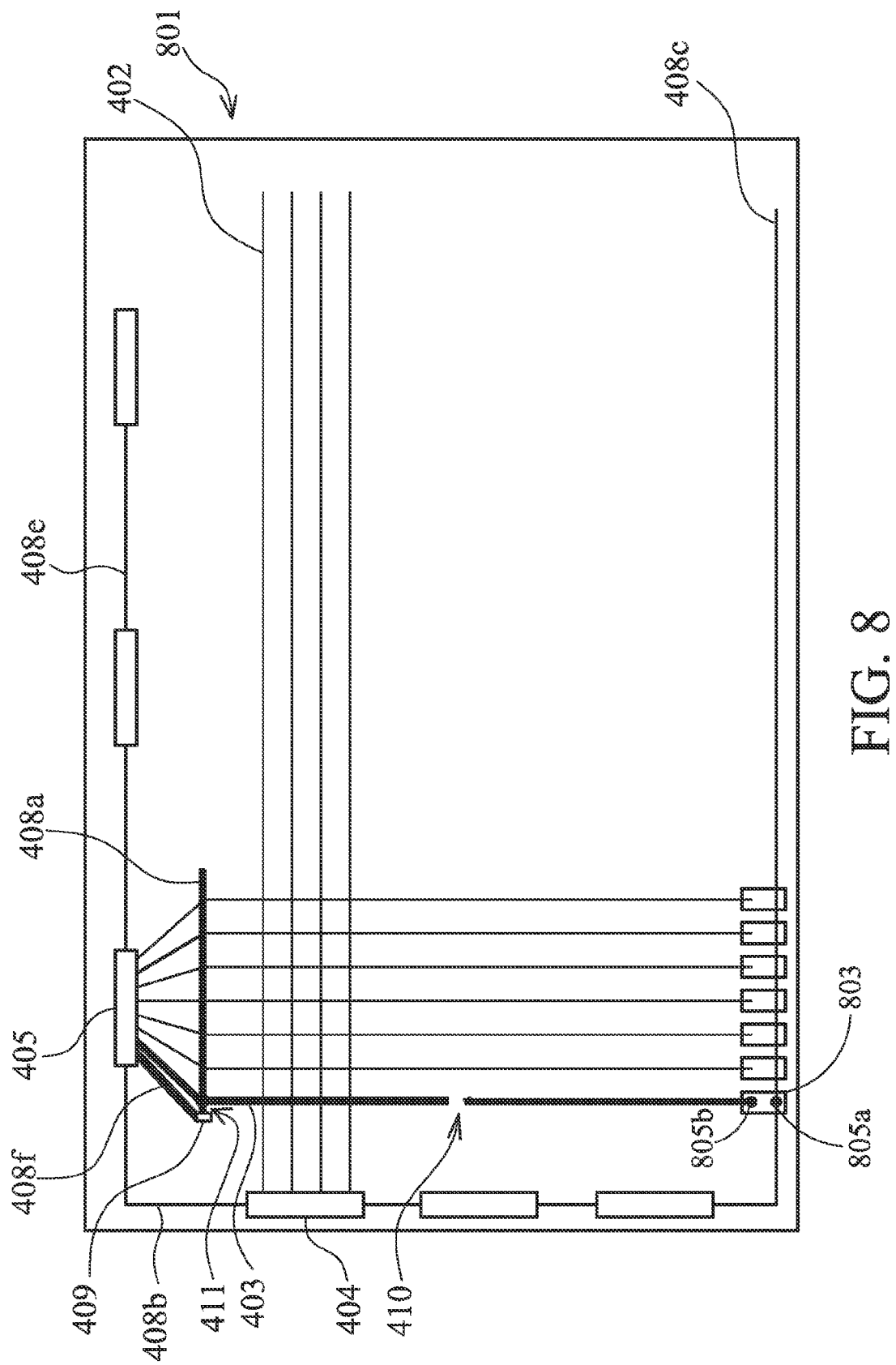
FIG. 8 shows a data line repair structure for a liquid crystal display panel according to another embodiment of the invention.

FIG. 8 shows a data line repair structure for a liquid crystal display panel according to another embodiment of the invention. Liquid crystal display panel 801 is similar to the embodiment of the invention shown in FIG. 6, except that, here, source driving chip 405 uses conductive glue to connect with an X side area of liquid crystal display panel 801. Thus, the data line repair structure further comprises fifth repair line 408e and sixth repair line 408f. Fifth repair line 408e is parallel to scan line 402 and connected to source driving chip 405. Sixth repair line 408f is formed in an oblique line area of liquid crystal display 401 and connected to first repair line 408a and inner circuits of source driving chip 405. In addition, transparent conductive layer 409 is disposed between sixth repair line 408f and first repair line 408a.

As shown in FIG. 8, the laser beam can be implemented to weld first repair line 408a and data line 403 to form connecting point 411, weld third repair line 408c and floating line 803 to form connecting point 805a, weld data line 403 and floating line 803 to form connecting point 805b, and weld transparent conductive layer 409 to connect first repair line 408a with sixth repair line 408f when data line 403 comprises broken point 410. Thus, a data signal generated by source driving chip 405 is transmitted to data line below broken point 410 through first repair line 408a, sixth repair line 408f, inner circuits of source driving chip 405, fifth repair line 408e, second repair line 408b, inner circuits of gate driving chip 404, third repair line 408c and floating line 803, sequentially.

Figure 9:
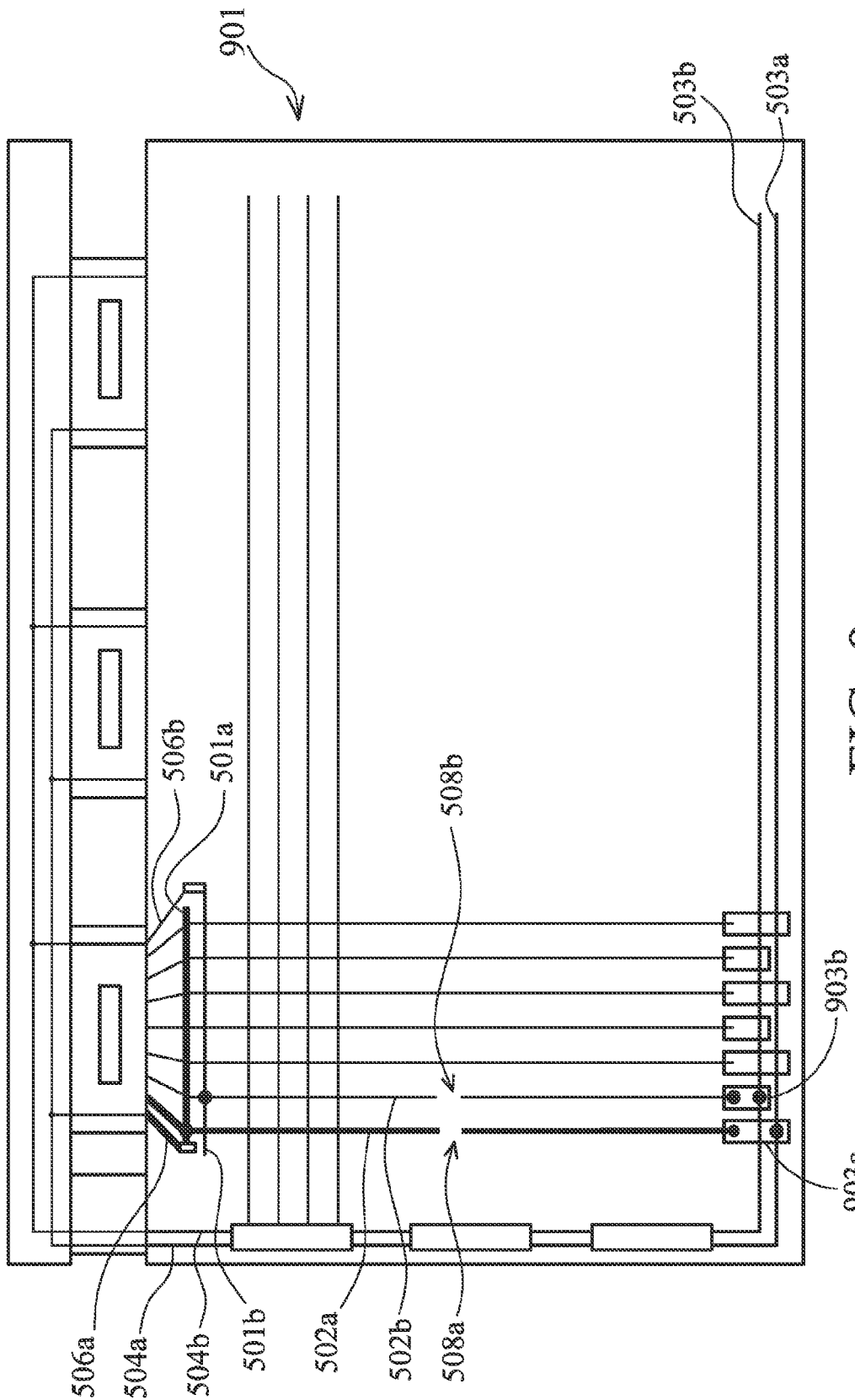
FIG. 9 shows a data line repair structure for a liquid crystal display panel according to another embodiment of the invention.

FIG. 9 shows a data line repair structure for a liquid crystal display panel according to another embodiment of the invention. Liquid crystal display panel 901 is similar to the embodiment of the invention shown in FIG. 5, except that, here, floating lines 903A and 903B are added, and third repair lines 503a and 503b are not crosses the end of odd data line 502a and even data line 502b on the opposite side of source driving chip. Specifically, third repair lines 503a and 503b are separated from the end of odd data line 502a and even data line 502b on the opposite side of source driving chip 205. Floating line 903A crosses a portion of third repair line 503a and overlaps the end of odd data line 502a, and is welded by a laser beam to connect the third repair line 503a with the end of odd data line 502a where odd data line 502a comprises broken point 508a. Floating line 903B crosses a portion of third repair line 503b and overlaps the end of even data line 502b, and is welded by a laser beam to connect the third repair line 503b with the end of even data line 502b where even data line 502b comprises broken point 508b.

Thus, when odd data line 502a has a broken point 508a, data signal can be transmitted to data line below broken point 508a through first repair line 501a, fourth repair line 506a, second repair line 504a, third repair line 503a and floating line 903a. When even data line 502b has a broken point 508b, the data signal can be transmitted to data line below broken point 508b through first repair line 501b, fourth repair line 506b, second repair line 504b, third repair line 503b and floating line 903b. Since the data lines other than data lines 502a and 502b are not electrically connected to third repair lines 503a and 503b and without any overlapping with third repair lines 503a and 503b, resistive-capacitive (RC) delay and signal interference among the data lines without broken point and third repair lines 503a and 503b are reduced.

Figure 10:
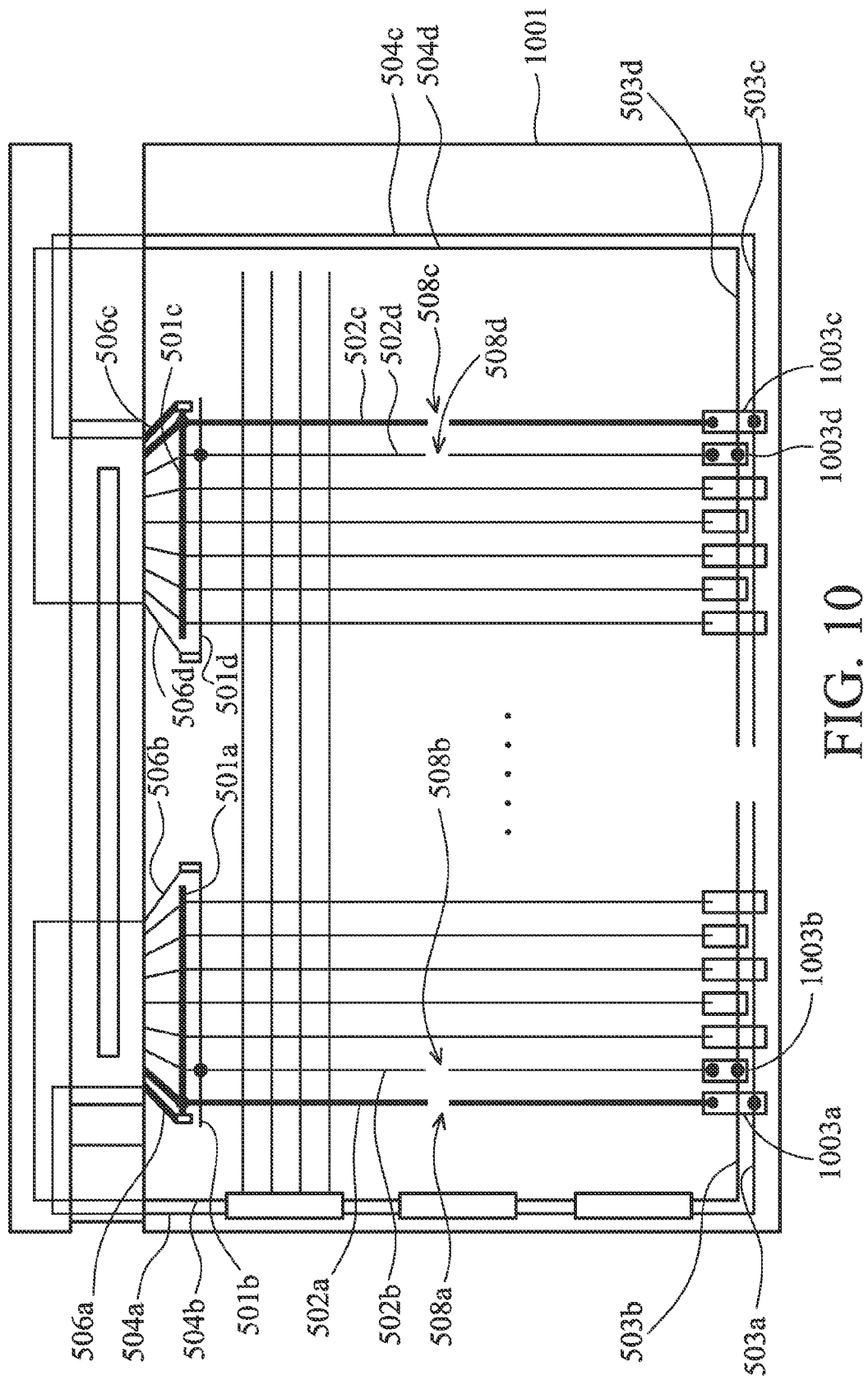
FIG. 10 shows a data line repair structure for a liquid crystal display panel according to another embodiment of the invention.

FIG. 10 shows a data line repair structure for a liquid crystal display panel according to another embodiment of the invention. As shown in FIG. 10, first repair lines 501a and 501b are welded and connected to data line 502a and data line 502b, respectively. Floating line 1003a is welded and connected between third repair line 503a and data line 502a. Floating line 1003b is welded and connected between third repair line 503b and data line 502b. In addition, first repair lines 501c and 501d are welded and connected to data line 502c and data line 502d, respectively. Floating line 1003c is welded and connected between third repair line 503c and data line 502c. Floating line 1003d is welded and connected between third repair line 503d and data line 502d.

Thus, when data line 502a has a broken point 508a, the data signal can be transmitted to data line below broken point 508a through first repair line 501a, fourth repair line 506a, second repair line 504a, third repair line 503a, and floating line 1003a. When data line 502b has a broken point 508b, the data signal can be transmitted to data line below broken point 508b through first repair line 501b, fourth repair line 506b, second repair line 504b, third repair line 503b, and floating line 1003b. Similarly, when data line 502c has a broken point 508c, the data signal can be transmitted to data line below broken point 508c through first repair line 501c, fourth repair line 506c, second repair line 504c, third repair line 503c, and floating line 1003c, and when data line 502d has a broken point 508d, the data signal can be transmitted to data line below broken point 508d through first repair line 501d, fourth repair line 506d, second repair line 504d, third repair line 503d, and floating line 1003d. In this embodiment, four data lines with a broken point can be repaired, improving repair efficiency of data lines. In addition, since the data lines other than data lines 502a, 502b, 502c, and 502d are not electrically connected to third repair lines 503a, 503b, 503c, and 503d and without any overlapping with third repair lines 503a, 503b, 503c, and 503d, resistive-capacitive (RC) delay and signal interference among the data lines without a broken point and third repair lines 503a, 503b, 503c, and 503d are reduced.

The invention relates to a data line repair structure and repair method for liquid crystal display panels. The feature of the invention is that the floating line overlaps the repair line and the data line without electrically connection before welded by a laser beam, and is connected between the repair line and the data line for transmitting data signals after welded. Based on the liquid crystal display panel of the invention, the gate driving chip is a chip-on-glass structure or thin film-on-glass structure. The source driving chip is a chip-on-glass structure or tape carrier package structure.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data line repair method for a liquid crystal display panel comprising:
   providing a liquid crystal display panel having a data line with a broken point, a third repair line separated from a second end of the data line, a floating line crossing a portion of the third repair line and overlapping the second end of the data line;

welding the second end of the data line and the floating line to form a second connecting point; and welding the third repair line and the floating line to form a third connecting point.

2. The data line repair method as claimed in claim 1, wherein the liquid crystal display panel having a first repair line crossing a first end of the data line.

3. The data line repair method as claimed in claim 2, comprising:

welding the first repair line and the first end of the data line to form a first connecting point.

4. The data line repair method as claimed in claim 1, wherein the liquid crystal display panel having:

a fourth repair line coupled to the first repair line; and a transparent conductive layer disposed between fourth repair line and the first repair line.

5. The data line repair method as claimed in claim 4, comprising:

welding the transparent conductive layer to connect the first repair line with the fourth repair line.

6. The data line repair method as claimed in claim 1, wherein the liquid crystal display panel having a second repair line parallel to the data line.

7. The data line repair method as claimed in claim 1, wherein the data line of the liquid crystal display panel is an odd data line or an even data line.

8. The data line repair method as claimed in claim 6, wherein the liquid crystal display panel having a gate driving chip coupled to the second repair line and bound to a flexible board.

9. The data line repair method as claimed in claim 6, wherein the second repair line coupled to the gate driving chip by a line of the flexible board.

10. The data line repair method as claimed in claim 9, wherein the third repair line coupled to the gate driving chip by another line of the flexible board.

11. The data line repair method as claimed in claim 6, wherein the second repair line coupled to a bypass circuit line by the flexible board.

12. The data line repair method as claimed in claim 11, wherein the third repair line coupled to the bypass circuit line by the flexible board.

13. The data line repair method as claimed in claim 1, wherein the liquid crystal display panel having a fifth repair line parallel to a scan line and coupled to a source driving chip.

14. The data line repair method as claimed in claim 13, wherein the source driving chip is bound to the liquid crystal display panel.

15. The data line repair method as claimed in claim 13, wherein the liquid crystal display panel having a sixth repair line formed in an oblique area of the liquid crystal display panel, and coupled to a first repair line and the source driving chip.

16. The data line repair method as claimed in claim 15, wherein a transparent conductive layer is disposed between the sixth repair line and the first repair line.

17. The data line repair method as claimed in claim 16 comprising:

welding the transparent conductive layer to connect the first repair line with the sixth repair line.

18. The data line repair method as claimed in claim 1, wherein the liquid crystal display panel having:

a scan line, the data line crossing the scan line;

a thin film transistor formed where the scan line crosses the data line and connected to a pixel electrode;

a gate driving chip electrical connected to the scan line to generate a gate signal to drive the thin film transistor; and a source driving chip connected to the data line to provide a data signal to the pixel electrode.

* * * * *